United States Patent Office 3,687,671
Patented Aug. 29, 1972

3,687,671
PHOTOGRAPHIC LAYERS CONTAINING COMPOUNDS WHICH ABSORB ULTRAVIOLET LIGHT
Manfred Kreuder and Wolfgang Metzner, Krefeld, Johannes Sobel, Leverkusen, Wolfgang Himmelmann, Opladen, and Fritz Nittel and Willibald Pelz, Cologne, Germany, assignors to Agfa-Gevaert Aktiengesellschaft, Leverkusen, Germany
No Drawing. Filed Dec. 15, 1970, Ser. No. 98,471
Claims priority, application Germany, Dec. 20, 1969,
P 19 63 995.3
Int. Cl. G03c 1/84
U.S. Cl. 96—84 R                        7 Claims

ABSTRACT OF THE DISCLOSURE

The light stability of photographic dye images are improved by applying a UV-absorbing layer containing a combination of UV-absorbents.

---

The invention relates to layers which contain UV absorbents for use in photographic materials.

Numerous compounds are known which absorb the UV component of light and are therefore suitable for the production of UV filters and UV protective coatings. Coatings of this type are used in the photographic industry for increasing the light fastness of dye images. For maximum effect, the UV absorbents should be incorporated in as high a concentration as possible in a separate protective layer. They generally cannot be used together with the image dyes either homogeneously or heterogeneously distributed in the same layer, because an antagonistic effect is often observed which leads to substantial bleaching of the image. The UV absorbents should as far as possible be colorless and have a high extinction in the UV range and should also be as stable as possible.

The UV absorbents may be used in various forms, e.g. in water-insoluble binders. In such a case, the finished color image is coated with such a solution in a separate step. This method, however, is only economical for large images and is therefore not generally applicable. Diffusion-fast incorporation of water-soluble and water-soluble UV absorbents in a protective layer has been described. For this method, the UV absorbent must satisfy certain requirements with regards to its chemical and physical properties, e.g. it must be able to be used in a highly concentrated form in layers having a thickness of 1 to 2/μ without the UV absorbent crystallizing or separating in the form of an oil and leaving the layer. Naturally, a UV absorbent must not react with the photographic processing baths or undergo yellowing under the action of light. Various UV absorbents have already been described for the present purpose. However, none of these compounds satisfies practical requirements.

Among the various absorbents, aromatic azines have been particularly recommended, but these generally have a high melting point so that they are difficult to use owing to their tendency to crystallize. Derivatives of this type whihc are suitable for use in photographic layers, have a slight yellowish color of their own so that they impair the whites in colored images.

UV absorbents of the 2-phenyl-benzotriazole type and which satisfy the requirements of photographic practice quite well as regards their absorption properties, are also only of limited importance since they also tend to crystallize in the photographic layers.

It is among the objects of the invention to provide photographic layers containing UV-absorbents which are easily incorporated in the layers and only absorb in the UV region of the spectrum.

We now have found a photographic material comprising at least one UV-absorbing layer which contains UV absorbents of the following formula:

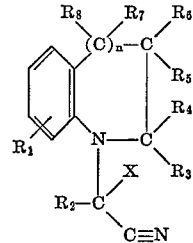

in which $R_1$ represents hydrogen, hydroxyl, alkoxy or alkyl preferably containing up to 5 carbon atoms, cycloalkyl such as cyclopentyl or cyclohexyl, in particular aralkyl benzyl or phenylethyl, amino which may be substituted for example with alkyl having up to 5 carbon atoms or carboxyl, carbalkoxy, carbamoyl, or halogen such as chlorine or bromine;

$R_2$ stands for hydrogen or alkyl with up to 4 carbon atoms;

$R_3$ to $R_8$ represents hydrogen or alkyl groups with up to 4 carbon atoms, the radicals $R_4$ and $R_5$ may together represent the ring members required to complete a 5-membered or 6-membered cycloalkane ring, preferably a fused cyclohexane ring;

$n$ is 0 or 1, preferably 0, and

X stands for carbalkoxy or alkylcarbonyl, the alkoxy or alkyl groups containing at least 4 carbon atoms and preferably 4 to 18 carbon atoms, or phenyl which may be substituted e.g. with alkyl which preferably contain up to 5 carbon atoms, cycloalkyl such as cyclopentyl or cyclohexyl, phenyl, halogen such as chlorine or bromine, hydroxy, alkoxy, etc.

The following are examples of compounds which may be used according to the invention:

A1
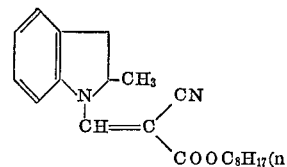

A2
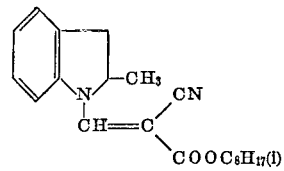

A3
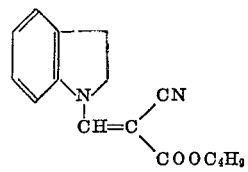

A4
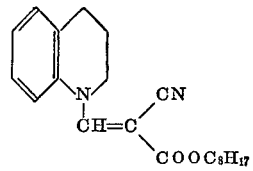

A5 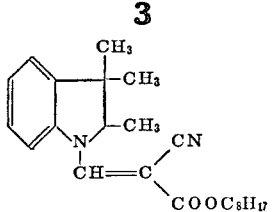

A6 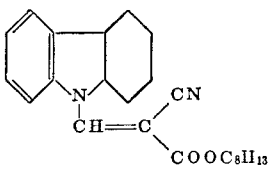

A7 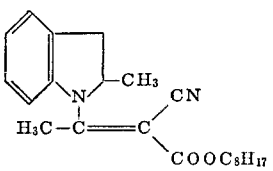

A8 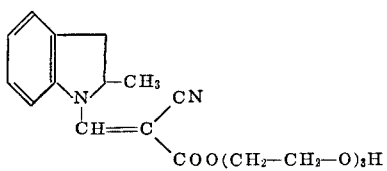

The compounds may be prepared by known methods, e.g. by reacting the corresponding CH-acidic compounds such as ethyl cyanoacetate, ω-cyanoacetophenone and α-cyanoacetone with orthocarboxylic acid esters such as trimethyl orthoformate, triethyl orthoformate, triethyl orthoacetate and triethyl orthopropionate in the presence of heterocyclic compounds such as indoline, 2-methyl indoline, 2,3,3-trimethyl indoline, 2,3,3-trimethyl-5-methoxy indoline, 1,2,3,4-tetrahydroquinaldine. See e.g. U.K. patent specification No. 1,186,777 or U.S. application Ser. No. 642,132, now Pat. No. 3,637,745.

If desired, the alkoxy vinyl compound may first be isolated from the CH-acidic compound by reacting it with orthocarboxylic acid esters, and the alkoxy vinyl compound may then be condensed with one of the above mentioned heterocyclic compounds.

According to a preferred embodiment of the invention, the above mentioned UV absorbing compounds may be used in combination with other UV absorbents of the 2-(2'-hydroxyphenyl)-benzotriazole series. UV absorbents of this series which are particularly suitable may be represented by the following general formula:

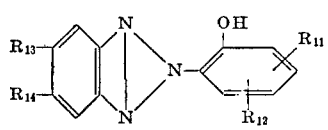

in which $R_{11}$ or $R_{12}$ represents hydrogen, alkyl or alkoxy with preferably up to 18 carbon atoms, cycloalkyl such as cyclopentyl or cyclohexyl, or halogen such as chlorine or bromine;
$R_{13}$ or $R_{14}$ stands for hydrogen or halogen such as a chlorine or bromine atom, alkyl with up to 18 carbon atoms or alkoxy with preferably up to 18 carbon atoms. The alkyl or alkoxy groups of the above mentioned substituents $R_{11}$ to $R_{14}$ are preferably branched.

The following are examples of suitable UV absorbents of this series:

B1 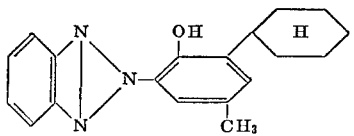

B2 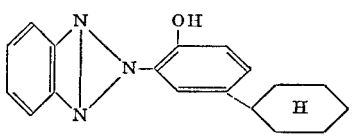

B3 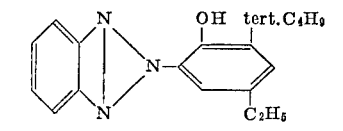

B4 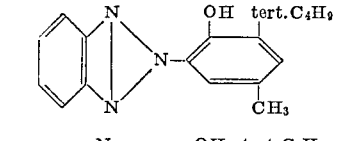

B5 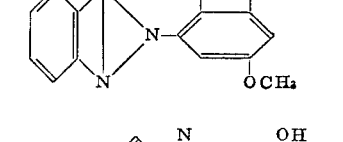

B6 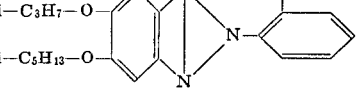

B7 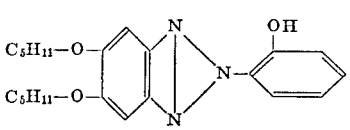

B8 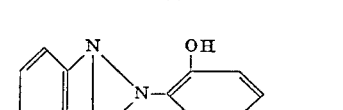

B9 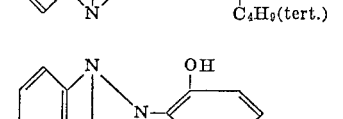

B10 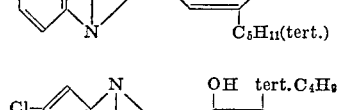

B11 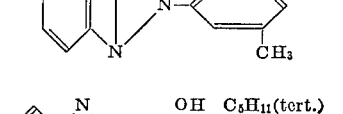

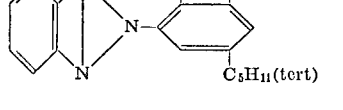

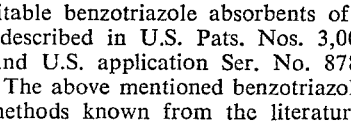

Other suitable benzotriazole absorbents of this series have been described in U.S. Pats. Nos. 3,004,896 and 3,253,921 and U.S. application Ser. No. 878,220, now abandoned. The above mentioned benzotriazoles are prepared by methods known from the literature; see, for example, the U.S. patents and application mentioned above.

The UV absorbents for use according to the invention have excellent compatibility with gelatin. Owing to the extremely high molar extinction, concentrations of only about 5 to 50% by weight, based on the weight of the binder of the layer, are sufficient to achieve a sufficient protective effect. Clear layers are obtained at these concentrations. No yellowing or impairment of the image whites is observed. The extremely high fastness to light of the UV absorbents is a particularly advantageous feature.

The UV absorbents are preferably emulsified into the casting solutions of the layer in the form of solutions in high boiling solvents, using a suitable dispersion apparatus.

The proportions of UV absorbents to solvents in the mixture may vary between 1:1 and 1:0.1. Low boiling auxiliary solvents may also be used, e.g. ethyl acetate, methylene chloride, alcohols and mixtures of these solvents. The low boiling solvents are removed by thin layer evaporation under vacuum after dispersion. Examples of water-insoluble high boiling compounds are dibutyl phthalate and tricresyl phosphate but preferably higher fatty acids, especially branched higher fatty acids having about 10 to 20 carbon atoms.

In the gelatin containing layers, the UV absorbents according to the invention have an absorption maximum at about 340 to 350 nm. with a steep absorption drop at about 370 to 380 nm.

When UV absorbents are used for protective layers in photographic materials, their absorption properties are particularly critical. The image dyes which are relatively highly sensitive to UV light so that destruction of the image dyes in many cases is brought about even by the longwave portion of the UV range of the spectrum. For this reason, the absorption flank should in these cases be as close as possible to the visible range, i.e. at about 400 nm. In that case, impairment of the image whites is often unavoidable since the UV absorbents will then already absorb in the blue region of the spectrum. The choice of suitable UV absorbents is particularly critical in view of these almost contradictory practical requirements, namely to obtain extensive protection of the image dye against ultraviolet radiation even from the longer waves end of the ultraviolet range while at the same time avoiding impairment of the image whites.

Particularly suitable from this point of view is a combination of UV absorbents of the indoline or tetrahydroquinoline series with the benzotriazole UV absorbents according to the preferred embodiment of the invention. A certain shift of the protective action in the long waved region of the ultraviolet range is thus obtained without yellowing of the image whites.

The proportion of benzotriazole UV absorbent in the total quantity of UV absorbent may vary within wide limits. Quantities of up to 50% by weight, based on the total amount of UV absorbents, and particularly about 10 to 50% by weight, are particularly effective.

Another advantage of the combination of UV absorbents is the reduction in the tendency to crystallization, especially in the case of benzotriazole UV absorbents which are difficult to use in the pure form owing to this disadvantage.

The combination of UV absorbents is preferably used in the form of a solution of UV absorbents in high boiling solvents, as described above. Incorporation of these solutions is effected in known manner by emulsification. Since the UV absorbents of the indoline and tetrahydroquinoline series are themselves partly liquids, they may be used as "oil-forming agents" and solvents for the benzotriazole UV absorbent component of the combination. It is, however, advisable also to use other solvents, as described above. This method provides no difficulties in the present case since both types of UV absorbents are very soluble in solvents which are used as so-called oil-forming agents for the preparation of photographic layers.

The UV absorbents for use according to the invention may, of course, also be used in combination with other UV absorbents.

The UV absorbents do not influence the photographic properties of adjacent layers and in particular the color coupling reaction in the case of dissolved color couplers is not retarded. Many of the known UV absorbents have an adverse effect in this respect.

When using multilayered color photographic materials, the concentration is chosen so that on exposure to light the stability of the image dyes is equally high in all three layers.

The thickness of the protective layers which contain the UV absorbents is 2 to 6 μm.

After the usual color photographic processing and testing the resulting color image for its resistance to light, an improvement by a factor of 4 to 10 is found compared with similar color photographic material which does not contain these protective layers.

To determine the improvement in light fastness, the two images of equal color density are exposed to light until they are both bleached to the same extent. The ratio of Lux hours required is a measure of the improvement factor. The improvement factor also depends, apart from the concentration of the UV absorbent, on the thickness of the protective layer.

The layers which contain UV absorbent are completely clear and practically colorless when dry. They can withstand the photographic process, e.g. a color development process, and are not destroyed. No yellowing can be detected even after prolonged exposure to light.

The compounds used according to the invention which absorb ultraviolet light may be dispersed in a binder and applied as an uppermost protective layer to a processing material, i.e. a material containing a finished colored photographic image, or to an unprocessed multilayered color photographic material. The UV absorbents may also be added to the blue sensitive silver halide emulsion layer which contains yellow coupler or to intermediate layers, for example layers which are arranged between the silver halide emulsion layers.

The UV absorbents for use according to the invention are suitable both for color photographic materials on a transparent support and for color photographic materials on an opaque layer support such as baryta-coated paper.

EXAMPLE 1

The following layers are applied onto a support of paper which has been coated on both sides with a thin layer of white pigmented polyethylene:

(1) A red-sensitive silver chlorobromide gelatin emulsion layer containing a water-soluble, diffusion-fast cyan coupler,
(2) an intermediate gelatin layer,
(3) a layer containing a green-sensitive silver chlorobromide gelatin emulsion with a diffusion-fast magenta coupler,
(4) an intermediate gelatin layer,
(5) a silver bromide gelatin emulsion layer containing a diffusion-fast yellow coupler.

When dry, the material is cup up into several strips. A simple gelatin layer is applied to one of the strips (thickness 3 μm.).

In another sample, a layer containing UV absorbent is cast from a casting solution of the following composition: A solution of 30 g. of compound A 1,
3 g. of bis-(2-ethyl)-hexyl ester of sulfosuccinic acid and
15 g. of a mixture of highly branched aliphatic carboxylic acids having 15 to 19 carbon atoms, in
30 g. of ethanol and
30 g. of methylene chloride is emulsified at 50° C. in 1 l. of a 10% gelatin solution which contains 50 ml. of a 10% saponin solution as wetting agent.

The UV protective layer is also of thickness 3 μm.

The two samples are both exposed in the same way and then processed as usual. The finished images, which have the same color density, are exposed to UV light to the same degree of bleaching. The proportion of Lux hours required for the two samples is a measure of the improvement factor. The results of the stability test at daylight based on measurements at a density of 1.5 are shown in the following table:

| | Improvement factor |
|---|---|
| Yellow | 5.8 |
| Magenta | 5.6 |
| Cyan | 5.2 |

The layer containing UV absorbent does not influence the photographic properties. The development rate remains the same. No colored fog is observed.

EXAMPLE 2

The procedure is substantially the same as that described in Example 1 except that the casting solution for the layer which contains UV absorbent is not applied as separate layer arranged uppermost but is added to the cyan silver halide emulsion layer which contains yellow coupler. The composition of the casting solution is altered in that 100 g. of the same UV absorbent and 10 g. of bis-(2-ethyl)-hexyl ester of sulfosuccinic acid are added. The formulation is otherwise the same.

The same improvement is obtained as in Example 1. Equally good results are obtained when the mixture of branched fatty acids is replaced by the same quantity of other high boiling solvents of so-called oil-forming agents, e.g. dibutyl phthalate or high boiling phosphoric acid esters.

EXAMPLE 3

20 g. of compound A 1 and
10 g. of compound B 1 are emulsified in gelatin as described in Example 1 and used as indicated in Example 1.

EXAMPLE 4

66 g. of compound A 1 and
34 g. of compound B 1 are emulsified in gelatin as described in Example 2 and then processed. In the absence of compound A 1, compound B 1 crystallizes in the gelatin. The emulsions prepared according to Examples 3 and 4, on the other hand, are resistant to digestion and can be stored in the refrigerator.

EXAMPLE 5

20 g. of compound A 2 (B.P. 220 to 230° C. at 0.4 mm. Hg) and
10 g. of compound B 9 are emulsified in gelatin as described in Example 1 and processed.

EXAMPLE 6

66 g. of compound A 2 and
34 g. of compound B 1 are emulsified in gelatin as described in Example 2 and then processed.

EXAMPLE 7

15 g. of compound A 1 and
15 g. of compound B 6 are emulsified in gelatin as described in Example 1 and then processed.

EXAMPLE 8

50 g. of compound A 1 and
50 g. of compound B 6 are emulsified in gelatin as described in Example 2 and then processed.

EXAMPLE 9

20 g. of compound A 1
10 g. of compound B 9 and
15 g. of dibutylphthalate are emulsified in gelatin as described in Example 1 and then processed.

EXAMPLE 10

66 g. of compound A 1
34 g. of compound B 9 and
25 g. of dibutyl phthalate are emulsified in gelatin as described in Example 2 and then processed.

In the embodiments according to Examples 3 to 10 described above, the resulting layers which contain UV absorbent are again completely clear and provide excellent protection for the color photographic image underneath them. A special advantage provided by the combination of UV absorbents is that the colored images are also protected against the longwave region of the ultraviolet range. Another advantage is the ease with which the layers which contain UV absorbent can be processed. Particularly in the case of combinations of UV absorbents, crystallization of the UV absorbent is completely prevented even in layers which contain a relatively high concentration of active compound.

EXAMPLE 11

Comparison of the crystallization tendency of mixtures of UV absorbents with pure benzothiazole UV absorbents:

(a)

20 g. of compound B 11 and
1 g. of bis-(2-ethyl)-hexyl ester of sulfosuccinic acid dissolved in
80 g. of ethyl acetate were emulsified in 200 ml. of a 10% gelatin solution at 55° C. After emulsification, the ethyl acetate was evaporated off.

(b)

20 g. of compound B 11,
10 g. of tricresyl phosphate and
1 g. of bis-(2-ethyl)-hexyl ester of sulfosuccinic acid dissolved in
80 g. of ethyl acetate were emulsified in 200 ml. of a 10% gelatin solution as in (a).

(c)

10 g. of substance A 1,
10 g. of substance B 11 and
1 g. of bis-(2-ethyl)-hexyl ester of sulfosuccinic acid dissolved in
80 g. of ethyl acetate were emulsified in 20 ml. of a 10% gelatin solution as in (a).

(d)

13 g. of compound A 1,
7 g. of compound B 11 and
1 g. of bis-(2-ethyl)-hexyl ester of sulfosuccinic acid dissolved in
80 g. of ethyl acetate were emulsified in 200 ml. of a 10% gelatin solution as in (a).

The samples were stored at 40° C. and one part was kept in a refrigerator.

Result:

| Sample | Comparison of tendency to crystallization | | | | |
|---|---|---|---|---|---|
| | Fresh | 4 hours | 20 hours | 3 days | 3 days refrigerator |
| (a) | Isolated crystallisation. | Marked crystallisation. | Heavy crystallisation. | Marked crystallisation. | Isolated crystallisation. |
| (b) | | | Isolated crystallisation. | Heavy crystallisation. | |
| (c) | | | | | |
| (d) | | | | | |

A dash entered in the results above indicates that no crystallization was observed.

We claim:

1. Photographic material comprising at least one silver halide emulsion layer containing UV absorbent of the following formula:

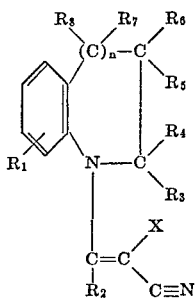

in which:

$R_1$=hydrogen, hydroxyl, alkoxy or alkyl, cycloalkyl, aralkyl, an amino group, carboxyl, carbalkoxy, carbamoyl or halogen;

$R_2$=hydrogen or alkyl having up to 4 carbon atoms;

$R_3$ to $R_8$=hydrogen or alkyl having up to 4 carbon atoms, the radicals $R_4$ and $R_5$ may together represent the ring members required for completing a 5-membered or 6-membered fused cycloalkane ring $n$=0 or 1;

X=carbalkoxy, the alkoxy group containing at least 4 carbon atoms.

2. The photographic material of claim 1 which contains in addition a 2-(2'-hydroxyphenyl)-benzotriazole UV absorbent compound.

3. The photographic material of claim 2, wherein the UV absorbent of the benzotriazole series has the following formula:

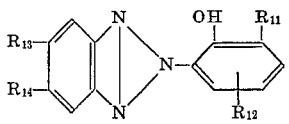

in which:

$R_{11}$ or $R_{12}$=hydrogen, alkyl or alkoxy, cycloalkyl or halogen;

$R_{13}$ or $R_{14}$=hydrogen, halogen, alkyl having up to 18 carbon atoms or alkoxy.

4. The photographic material of claim 1, wherein the UV absorbents are contained in a quantity of 5 to 50% by weight, based on the binder of the layer.

5. The photographic material of claim 1, wherein the UV absorbents are emulsified in the layer in the form of a solution in a higher boiling solvent.

6. The photographic material of claim 2, which contains the UV absorbent of the benzotriazole series in quantities of 10 to 50% by weight, based on the total quantity of UV absorbents.

7. A finished photographic element comprising a support having thereon at least one developed and fixed photographic emulsion layer containing a coupled-dye image subject to fading, and a gelatin layer containing an ultraviolet absorbing compound of the following formula:

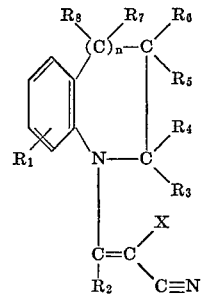

in which:

$R_1$=hydrogen, hydroxyl, alkoxy or alkyl, cycloalkyl, aralkyl, an amino group, carboxyl, carbalkoxy, carbamoyl or halogen;

$R_2$=hydrogen or alkyl having up to 4 carbon atoms;

$R_3$ to $R_8$=hydrogen or alkyl having up to 4 carbon atoms, the radicals $R_4$ and $R_5$ may together represent the ring members required for completing a 5-membered or 6-membered fused cycloalkane ring;

$n$=0 or 1;

X=carbalkoxy, the alkoxy group containing at least 4 carbon atoms.

References Cited

UNITED STATES PATENTS

| | | | |
|---|---|---|---|
| 3,491,114 | 1/1970 | Suh | 252—300 |
| 3,533,794 | 10/1970 | Ohi et al. | 96—84 |

RONALD H. SMITH, Primary Examiner

U.S. Cl. X.R.

252—300